US012789818B2

(12) United States Patent
Raichelgauz

(10) Patent No.: US 12,789,818 B2
(45) Date of Patent: Nov. 10, 2026

(54) PERCEPTION RELATED PROCESSES

(71) Applicant: AUTOBRAINS TECHNOLOGIES LTD., Tel Aviv-Jaffa (IL)

(72) Inventor: Igal Raichelgauz, Tel Aviv-Jaffa (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 131 days.

(21) Appl. No.: 18/625,888

(22) Filed: Apr. 3, 2024

(65) Prior Publication Data

US 2025/0313215 A1 Oct. 9, 2025

(51) Int. Cl.
*B60W 40/12* (2012.01)

(52) U.S. Cl.
CPC .................................. *B60W 40/12* (2013.01)

(58) Field of Classification Search
CPC ......................... G06V 20/44; B60W 2050/065
See application file for complete search history.

(56) References Cited

U.S. PATENT DOCUMENTS 5,638,116 A * 6/1997 Shimoura ............ G05D 1/0246 348/169
11,983,889 B1 * 5/2024 Hayes ..................... G06T 7/215
2004/0234135 A1 * 11/2004 Nomizu ................. G06V 10/56 358/1.9
2012/0147015 A1 * 6/2012 Rogers .................. G06F 9/5044 345/502
2012/0251003 A1 * 10/2012 Perbet ................ G06V 10/7635 382/173
2018/0240249 A1 * 8/2018 Uchigaito .............. G06V 40/10
2020/0125088 A1 * 4/2020 Raichelgauz ............ G08G 1/16

FOREIGN PATENT DOCUMENTS

WO WO-2022096942 A1 * 5/2022 ............... G06N 3/08

* cited by examiner

*Primary Examiner* — Logan M Kraft
*Assistant Examiner* — Joshua Campbell
(74) *Attorney, Agent, or Firm* — RECHES PATENTS

(57) ABSTRACT

A method that is computer implemented and is for perception related processes, the method includes (i) receiving, by a processing circuit of the vehicle, scenario information about a scenario faced by a vehicle; wherein the scenario information includes environmental information about an environment of the vehicle; (ii) identifying the scenario, by the processing circuit, using the received scenario information; (iii) determining, based on the identified scenario, a resource operation parameter that conform to the identified scenario and is related to operation of a perception related process; and (iv) making the resource operation parameter available in the operation of the perception related process.

17 Claims, 8 Drawing Sheets

Vehicle 100

Vehicle 100

200

660

PERCEPTION RELATED PROCESSES

FIELD OF DISCLOSURE

The present disclosure relates to the field of computer technology, and more particularly, to a method, non-transitory computer-readable medium, and a system for performing perception processes.

BACKGROUND

Assisted and autonomous driving systems are known in the art. In such systems, computer implemented systems control (at least to some extent) some, or all, of a vehicle's driving functions, e.g., speed, telemetry, braking, etc. The vehicle is typically equipped with one or more sensors to provide the system with current information regarding the driving environment. The current information for the driving environment is typically used by the driving system to determine how to drive on roadways.

One of the major tasks related to driving is classifying.

Therefore, there is a growing need to provide efficient classification systems and methods.

SUMMARY

The present disclosure provides a method, non-transitory computer-readable storage medium and computer-implemented system for performing perception processes.

In a first aspect of the present disclosure, a method that is computer implemented and is for perception related processes is provided. The method includes: receiving, by a processing circuit of the vehicle, scenario information about a scenario faced by a vehicle, wherein the scenario information comprises environmental information about an environment of the vehicle; identifying the scenario, by the processing circuit, using the received scenario information; determining, based on the identified scenario, a resource operation parameter that conform to the identified scenario and is related to an operation of a perception related process; and making the resource operation parameter available in the operation of the perception related process.

In another aspect of the present disclosure, a non-transitory computer readable medium for perception related processes, the non-transitory computer readable medium stores instructions that once executed by a computerized system cause the object computerized system to: receive, by a processing circuit of the vehicle, scenario information about a scenario faced by a vehicle, wherein the scenario information comprises environmental information about an environment of the vehicle; identify the scenario, by the processing circuit, using the received scenario information; determine, based on the identified scenario, a resource operation parameter that conform to the identified scenario and is related to an operation of a perception related process; and make the resource operation parameter available in the operation of the perception related process.

In yet another aspect of the present disclosure, a computerized system for perception related processes, the computerized system includes: a memory unit that is configured to store scenario information about a scenario faced by a vehicle; wherein the scenario information comprises environmental information about an environment of the vehicle; and a processing circuit that is configured to: identify the scenario using the received scenario information; determine, based on the identified scenario, a resource operation parameter that conform to the identified scenario and is related to an operation of a perception related process; and make the resource operation parameter available in the operation of the perception related process.

A BRIEF DESCRIPTION OF THE DRAWINGS

The embodiments of the disclosure will be understood and appreciated more fully from the following detailed description, taken in conjunction with the drawings in which.

DETAILED DESCRIPTION

The different figures illustrates examples of units and/or software and/or information items and/or steps and/or components. These examples are provided for brevity of explanation. At least one of the units and/or software and/or information items and/or steps and/or components is optional or mandatory.

According to an embodiment, there is provided a method, a system and a non-transitory computer readable medium for perception related processes—especially control the manner in which a perception related process is executed—based on a scenario to provide an optimized or sub-optimizes resources allocation and/or usage during driving.

According to an embodiment the method includes:

a. Receiving, by a processing circuit of the vehicle, scenario information about a scenario faced by a vehicle; wherein the scenario information includes environmental information about an environment of the vehicle.
b. Identifying the scenario, by the processing circuit, using the received scenario information.
c. Determining, based on the identified scenario, a resource operation parameter that conform to the identified scenario and is related to operation of a perception related process.
d. Making the resource operation parameter available in the operation of the perception related process.

Figure 1A:
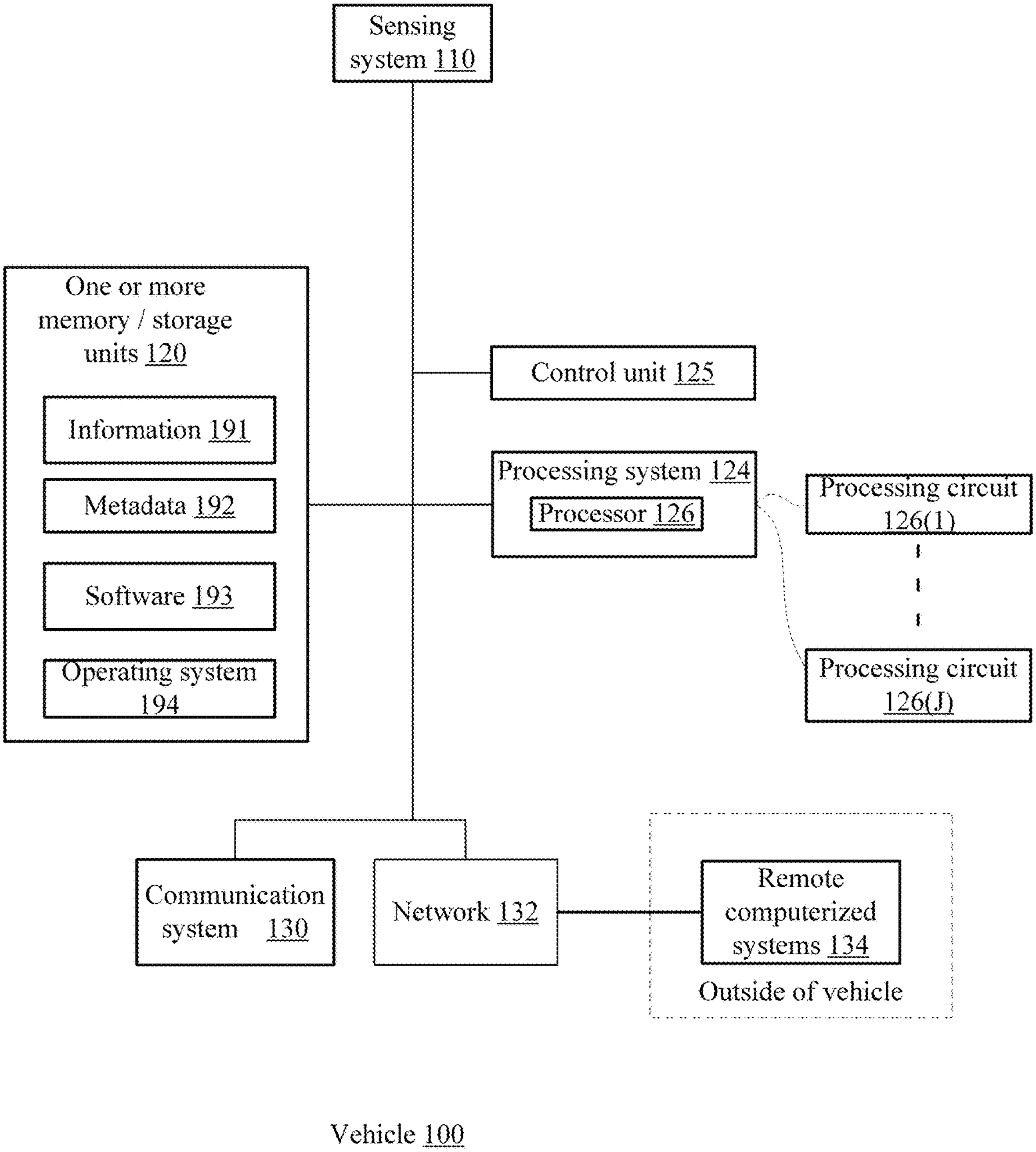
FIG. 1A illustrates a block diagram of an example of a system, according to an embodiment of the present disclosure.
Figure 1B:
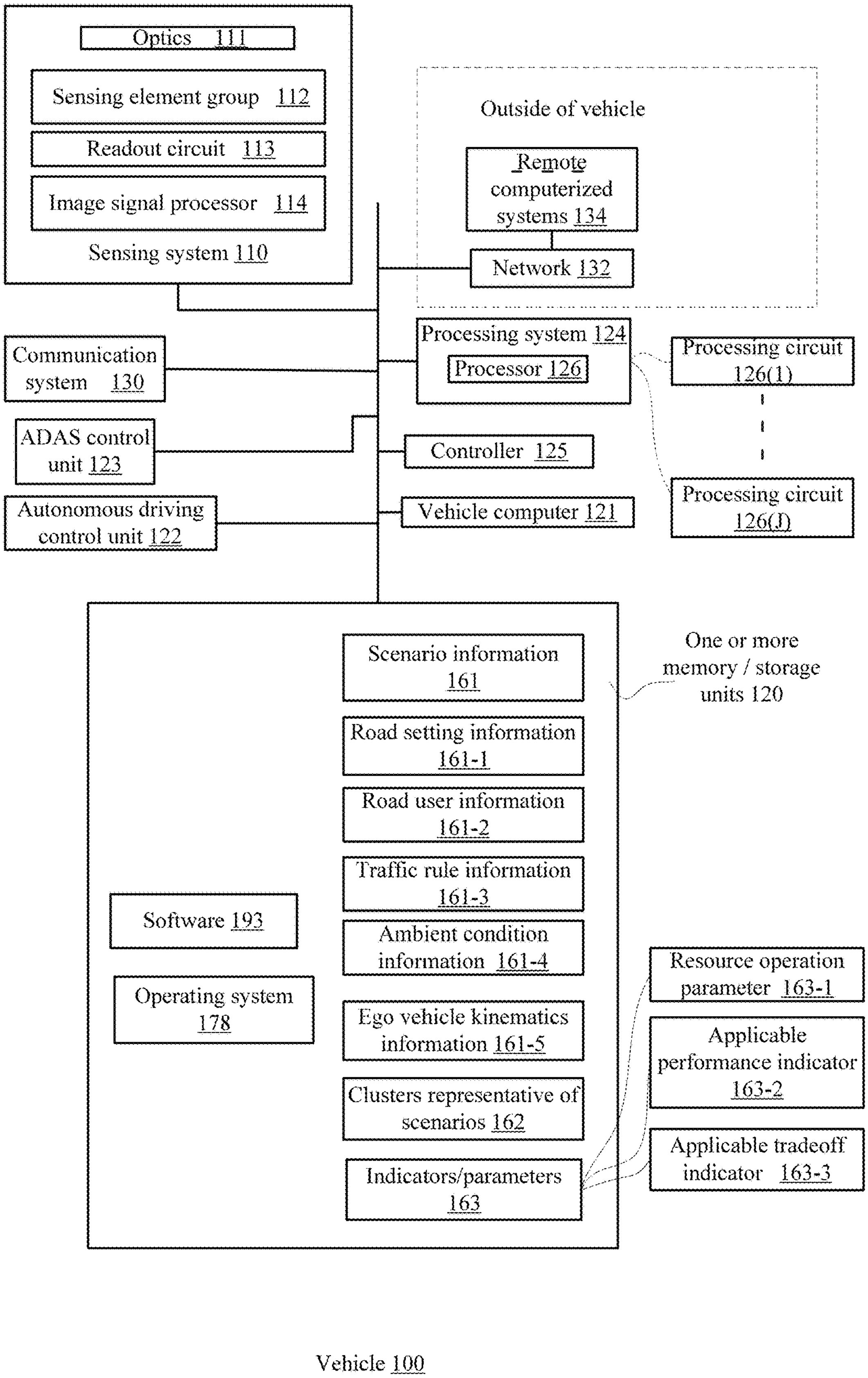
FIG. 1B illustrates a block diagram of an example of a system, according to an embodiment of the present disclosure.
Figure 1C:
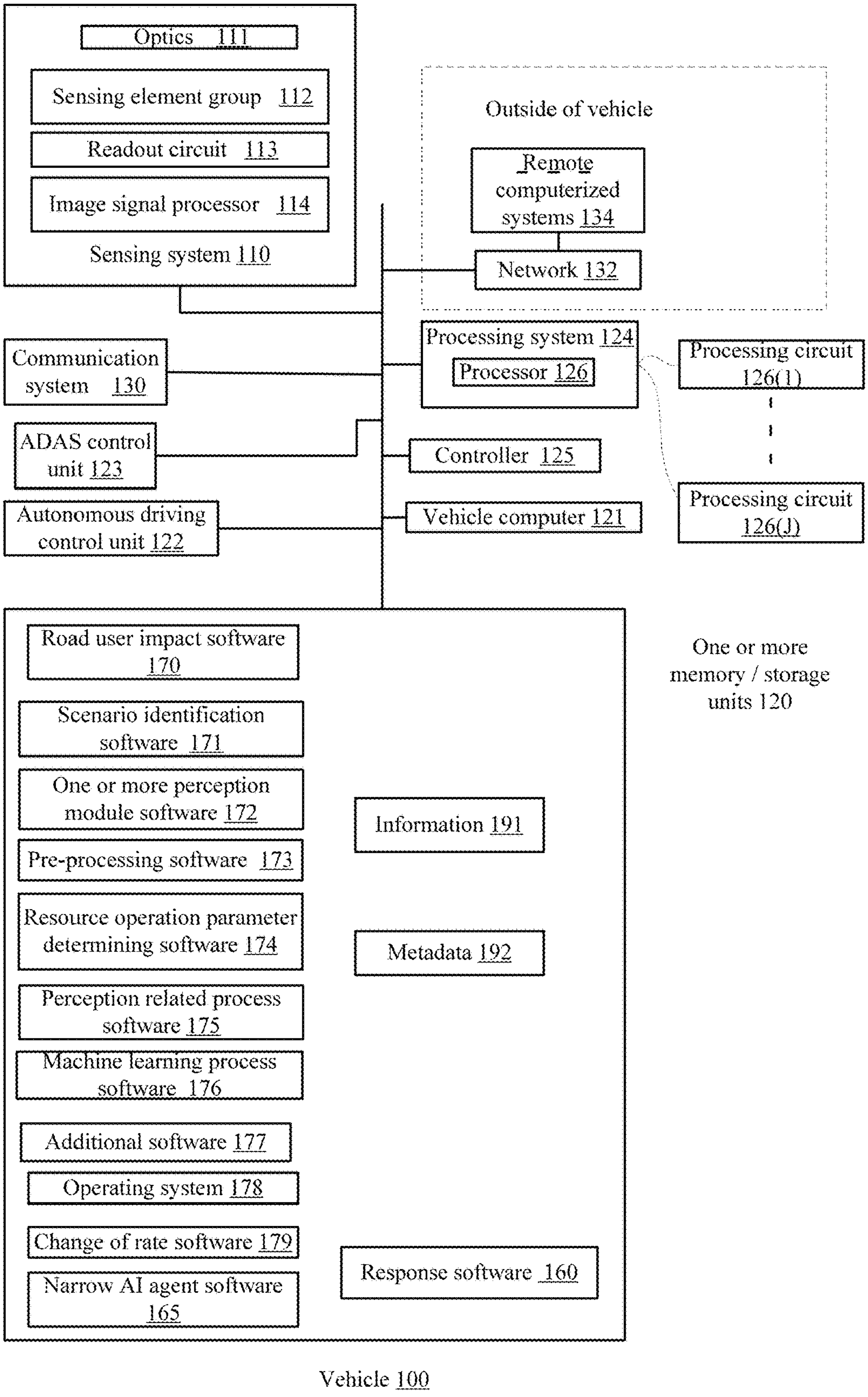
FIG. 1C illustrates a block diagram of an example of a system, according to an embodiment of the present disclosure.

FIGS. 1A, 1B and 1C illustrate examples of a vehicle 100, a network 123 and remote computerized systems 134.

In FIG. 1A the vehicle 100 is illustrated as including sensing system 110, a communication system 130, one or more memory and/or storage units 120, control unit 125', network 132 in communication with remote computerized systems 134.

The one or more memory and/or storage units 120 is illustrated as storing information 191, metadata 192, software 193 and operating system 194. The information 191, metadata 192, software 193 and operating system 194 are required for executing one or more methods illustrated in the specification.

In FIGS. 1B and 1C the control unit 125' is replaced by different components such as advanced driver assistance system (ADAS) control unit 123, autonomous driving control unit 122, vehicle computer 121, and controller 125. It is noted that only some or these components may be included in the vehicles.

FIG. 1B also provides examples of one or more types of information 191 and metadata 192 stored in the one or more memory and/or storage units 120.

FIG. 1C also provides examples of one or more types of software 193 stored in the one or more memory and/or storage units 120.

The vehicle 100 includes sensing system 110, a communication system 130, one or more memory and/or storage units 120, and additional units that include advanced driver assistance system (ADAS) control unit 123, autonomous driving control unit 122, vehicle computer 120, controller 125, processing system 124 including processor 126. Network 123 is in communication with the vehicle and with the remote computerized systems 134 such as servers, cloud computers, and the like.

Communication system 130, one or more memory and/or storage units 120, and processing system 134 may form a computerized system. The computerized system may include one or more other systems and/or units such as sensing system 110 (at least the image signal processor 114), the ADAS control unit 123, the autonomous driving control unit 122, the vehicle computer 120, and the controller 125.

According to an embodiment, the sensing system 110 include optics 111, a sensing element group 112, a readout circuit 113, and an image signal processor 114. Optics 111 are followed by sensing element group 112 such as line of sensing elements or an array of sensing elements that form the sensing element group. The sensing element group is followed by a readout circuit 113 that reads detection signals generated by the sensing element group. An image signal processor 114 is configured to perform an initial processing of the detection signals—for example by improving the quality of the detection information, performing noise reduction, and the like. The sensing system 110 is configured to output one or more sensed information units (SIUs).

The communication system 130 is configured to enable communication between the one or more memory and/or storage units 120 and/or the sensing system 110 and/or any one of the additional units and/or the network 132 (that is in communication with the remote computerized systems).

The controller 125 is configured to control the operation of the sensing system 110, and/or the one or more memory and/or storage units 120 and/or the one or more additional units (except the controller).

The ADAS control unit 123 is configured to control ADAS operations. An ADAS operation may include performing an autonomous operation (for example emergency braking, performing a short term autonomous driving operation-such as keeping lane and/or autonomous parking and/or and/or autonomously driving the vehicle during the short term—that may range between 0.1 to 2, 3, 4, 5, 6, 7, 8, 9, 10 seconds and the like), suggesting a driving operation to be made by a human driver, suggesting a path to be followed by the human driver driven vehicle.

The autonomous driving control unit 122 is configured to control autonomous driving of the autonomous vehicle.

The vehicle computer 121 is configured to control the operation of the vehicle-especially controlling the engine, the transmission, and any other vehicle system or component.

The processing system 124 may include processor 146 and one or more other processors and is configured to execute any method illustrated in the specification.

The one or more memory and/or storage units 120 are configured to store firmware and/or software, one or more operating systems, data and metadata required to the execution of any of the methods mentioned in this application.

FIG. 1B illustrates the one or more memory and/or storage units 120 as storing:

a. Scenario information 161 that may include at least one of:

i. Road setting information 161-1.

ii. Road user information 161-2.

iii. Traffic rule information 161-3.

iv. Ambient condition information 161-4.

v. Ego vehicle kinematics information 161-5.

b. Information regarding different scenarios-such as clusters representative of the scenarios 162.

c. Indicators and/or parameters such as resource operation parameter 163-1. Applicable performance indicator 163-2 and applicable tradeoff indicator 163-3. The applicable performance indicator 163-2 and/or applicable tradeoff indicator 163-3 may be determined in any manner and/or by any entity—an end user, a vendor or suppliers, a mechanic, based on prior use of previous vehicles, based on history, based on training, based on machine learning, and the like.

FIG. 1C illustrates one or more types of software that include:

d. Road user impact software 170.

e. Scenario identification software 171.

f. One or more perception module software 172.

g. Pre-processing software 173.

h. Resource operation parameter determining software 174.

i. Perception related process software 175.

j. Machine learning process software 176.

k. Additional software 177 that may be used to perform any other functionality of the vehicle and/or of any of the other units illustrated in FIG. 1.

l. Operating system 178.

m. Change of rate software 179.

n. Response software 180.

o. Narrow AI agent software 165.

The vehicle computer 121 may be in communication with an engine control module, a transmission control module, a powertrain control module, and the like The memory and/or storage units 120 was shown as storing software. Any reference to software should be applied mutatis mutandis to code and/or firmware and/or instructions and/or commands, and the like.

Processor 126 includes a plurality of processing units 126(1)-126(J), J is an integer that exceeds one. Any reference to one unit or item should be applied mutatis mutandis to multiple units or items. For example—any reference to processor should be applied mutatis mutandis to multiple processors, any reference to communication system 130 should be applied mutatis mutandis to multiple communication systems.

According to an embodiment, the one or more memory and/or storage units 120 includes one or more memory unit, each memory unit may include one or more memory banks.

According to an embodiment, the one or more memory and/or storage units 120 includes a volatile memory and/or a non-volatile memory. The one or more memory and/or storage units 120 may be a random-access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any content may be stored in any part or any type of the memory and/or storage units.

According to an embodiment, the at least one memory unit stores at least one database—such as any database known in the art—such as DB2®, Microsoft® Access, Microsoft® SQL Server, Oracle®, mySQL, PostgreSQL, and the like.

Various units and/or components are in communication with each other using any communication elements and/or protocols. An example of a communication system is denoted 130. Other communication elements may be provided.

FIG. 1 illustrates communication system 130 as being in communication with various processors and/or units and network 132.

The communication system 130 may include a bus. The represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems.

Network 132 is located outside the vehicle and is used for communication between the vehicle and at least one remote computing system. By way of example, a remote computing system can be a personal computer, a laptop computer, portable computer, a server, a router, a network computer, a peer device or other common network node, and so on. Logical connections between the processor and either one of remote computing systems can be made via a local area network (LAN) and a general wide area network (WAN). Such network connections can be through a network adapter (may belong to communication system 130) which can be implemented in both wired and wireless environments. Such networking environments are conventional and commonplace in offices, enterprise-wide computer networks, intranets, and a larger network such as the internet.

It should be noted that at least a part of the content illustrated as being stored in one or more memory/storage units 120 may be stored outside the vehicle. It should also be noted that the processor may evaluate signatures generated by a plurality of detectors.

According to an embodiment, the processor, while using the one or more memory/storage units 120 and the communication system 130 is configured to:

a. Receive scenario information 161 about a scenario faced by a vehicle. The scenario information may include at least one of road setting information 161-1, road user information 161-2, traffic rule information 161-3, regulation information 161-4, ambient condition information 161-5, and the like.
b. Feed the scenario information 161 to multiple perception modules. The multiple perception modules may be implemented by executing the one or more perception module software 172.
c. Identify the scenario using the scenario information—for example by executing scenario identification software 171.
d. Determine, based on the identified scenario, a resource operation parameter that conform to the identified scenario and is related to operation of a perception related process—for example by executing resource operation parameter determining software 174. The determining may be based on one or more parameters and/or indicators such as applicable performance indicator 163-2 and/or applicable tradeoff indicator 163-3 and/or rate of changes within the environment (that may be determined by executing change of rate software 179) and/or an estimated impact of a road user within the environment on the driving of the vehicle (the impact may be determined by executing road user impact software 170).
e. Respond to the determination (for example by executing response software). The responding may include, for example, (i) making the resource operation parameter available in the operation of the perception related process, and/or (ii) executing the perception related process.

According to an embodiment, one or more of these steps may be executed by one or more machine learning processes—for example by executing the machine learning process 176.

According to an embodiment, step 230 is followed by step 240 of

Figure 2A:
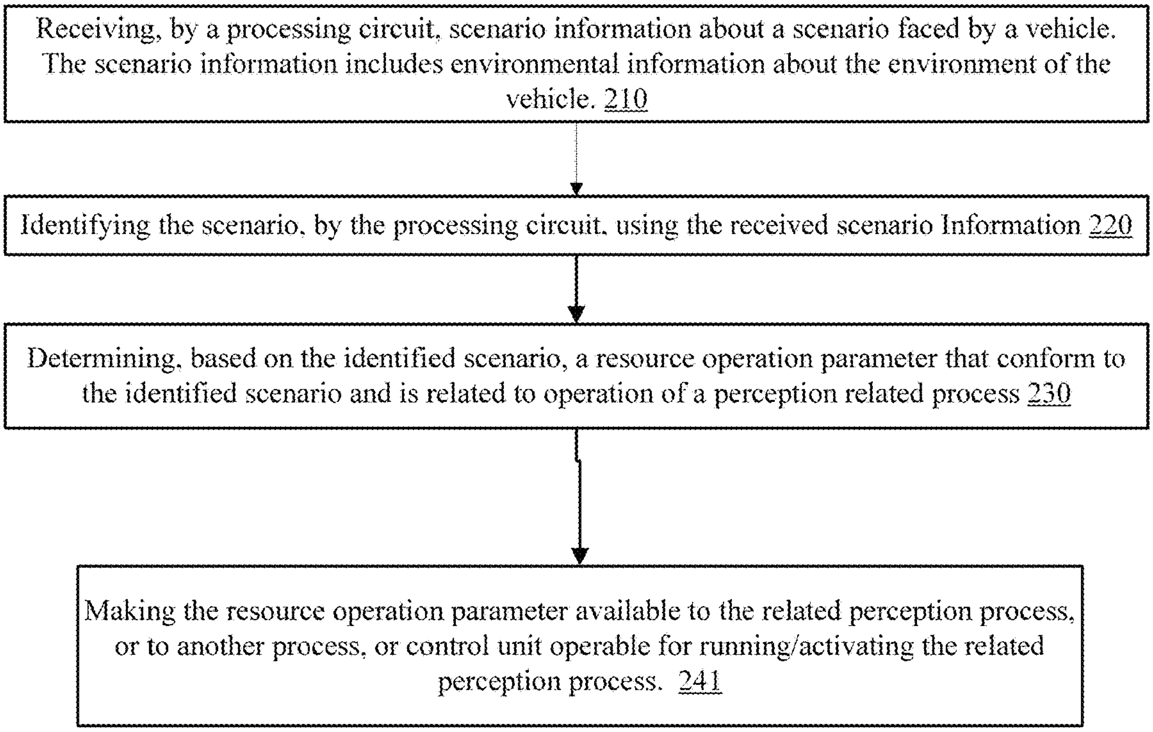
FIG. 2A illustrates a flowchart of an example of a method according to an embodiment of the present disclosure.
Figure 2B:
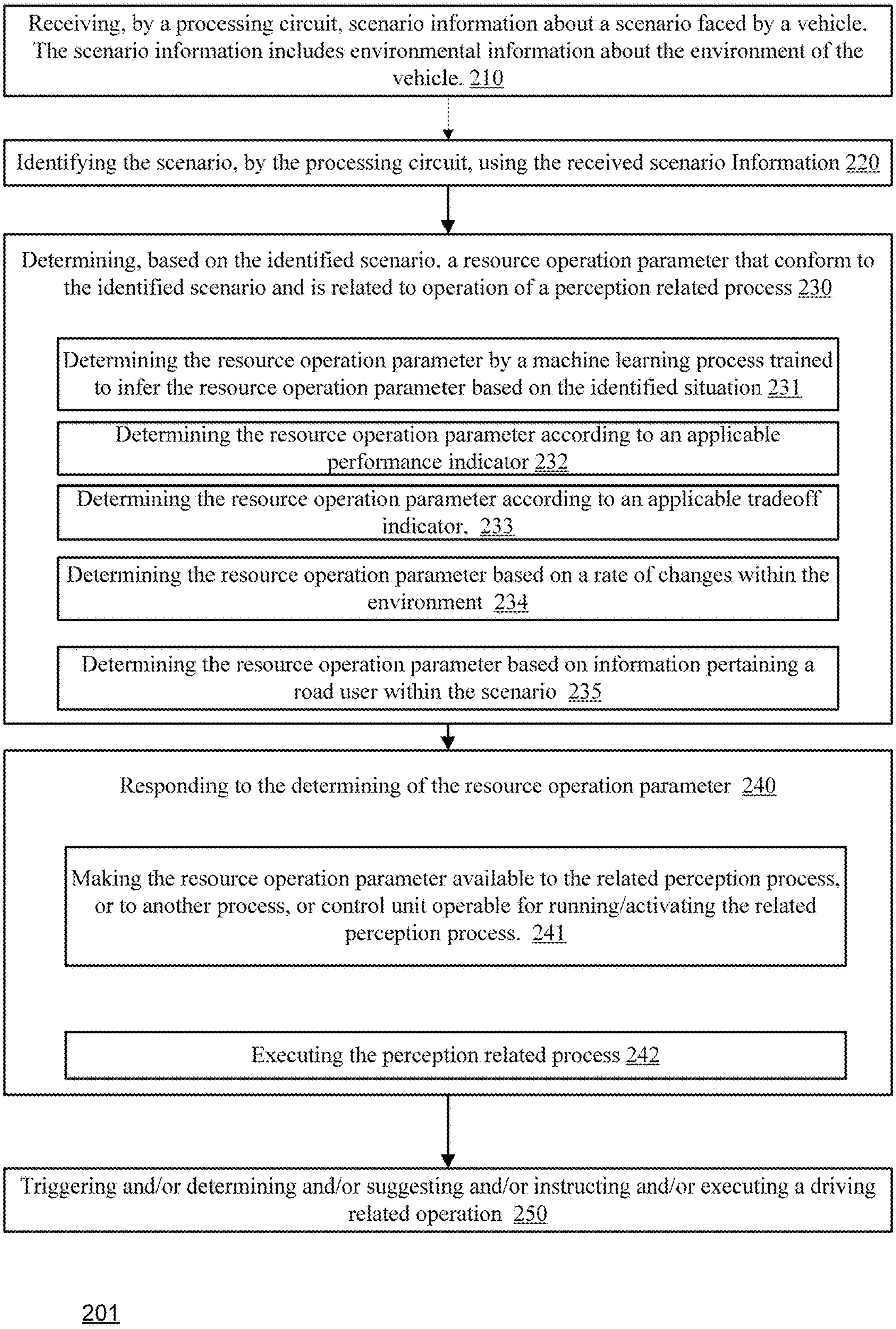
FIG. 2B illustrates a flowchart of an example of a method according to an embodiment of the present disclosure.

FIG. 2 illustrates a flowchart of an example of method 200 for perception related processes.

According to an embodiment, method 200 includes step 210 of receiving, by a processing circuit of the vehicle, scenario information about a scenario faced by a vehicle. The scenario information includes environmental information about the environment of the vehicle.

According to an embodiment, the scenario information also includes at least one of road setting information, road user information, traffic rule information, regulation information, ambient condition information, and the like According to an embodiment, the scenario information is a multi-dimensional information—for example be a combination of at two or more out of:

a. Road setting information—for example—static road features and context e.g., lanes, junction, merge, city, country.
b. Road user information—for example—dynamic players, their attributes and impact on ego-vehicle e.g., state of crossing pedestrian, rolling ball.

c. Traffic rule information—for example—temporary or permanent restrictions e.g., speed limits, traffic signs.

d. Ambient condition information—for example—visual and more characteristics e.g., rain, night, wind, tunnel.

e. Ego vehicle kinematics information—for example, ego-vehicle movement e.g., speed, yaw rate, acceleration/deceleration.

According to an embodiment, the multi-dimensional information is fed to multiple perception modules, one or more segments of the multi-dimensional information fed to the multiple perception modules or any representation or metadata about at least a part of the multiple perception modules.

According to an embodiment, the scenario information is fed to a single perception module.

According to an embodiment, the scenario information includes one or more sensed information units sensed by one or more sensors associated with a vehicle. A sensor associated with a vehicle is selected from a vehicle sensor and an out of vehicle sensor that monitors (for at least a defined period) the vehicle.

According to an embodiment, the scenario information is an outcome of pre-processing the one or more sensed information units. The pre-processing may include noise reduction and/or segmentation and/or any preliminary step that contributes to the detection of the scenario. For example—the preprocessing may include detecting objects, defining bounding shapes and the like.

According to an embodiment, step 210 is followed by step 220 of identifying the scenario, by the processing circuit, using the received scenario information.

According to an embodiment, the identifying includes classifying the scenario by applying any classification process—for example a machine learning classification process.

According to an embodiment, step 220 includes finding a match between a signature of a part of the scenario information and a cluster signature of a cluster that is associated with the scenario.

According to an embodiment the identification is based on a training process.

According to an embodiment the training is a self-learning training process that includes:

a. Collecting untagged information. According to an embodiment, the collecting involves collecting multi-dimension information—for example at least two types of information out of road setting information, road user information, traffic rule information, regulation information, ambient condition information and ego vehicle kinematics information.

b. Performing unsupervised clustering of multi-dimension information that represent different scenarios.

According to an embodiment the clustering is based on at least some of said dimensions of information—for example clustering information obtained when the vehicle progresses at a specified speed range in a highway—for example clustering information obtained when the vehicle progresses within a construction area in rain—for example—the vehicle drives in roundabout at another specified speed range.

According to an embodiment, step 220 is followed by step 230 of determining, based on the identified scenario, a resource operation parameter that conform to the identified scenario and is related to operation of a perception related process.

According to an embodiment, the resource operation parameters includes at least one out of:

a. A resolution of a sensor.

b. A resolution associated with a processing operation. Different resolutions may be applied to different regions of a sensed information unit (or of any information generated at least in part based on the sensed information unit).

c. A field of view sensed by a sensor.

d. A field of view associated with a processing operation. The processing operation may include generating the information based at least in part on the sensed information unit.

e. A rate of frames acquired by a sensor.

f. A rate of frames associated with a processing operation.

g. A selection of one or more resources for executing a perception related process.

h. A manner of operating a resource used during the executing of the perception related process, and the like.

i. A region of interest within a sensed information unit and/or a region of interest within a processed sensed information unit.

The mentioned above, a processing operation refers to any processing operations applied on a sensed information unit sensed by a sensor, or any information generated at least in part based on the sensed information unit.

There may be a difference between a sensor parameter and a processing parameter. For example—the sensor may acquire sixty images per second while less than sixty images are processed by a processor. Alternatively, more than sixty images are processed by the processor (which requires generating additional images—for example by estimating images that could have been acquired between consecutive images). Yet for another example—the resolution of an image may change between image acquisition and processing.

A resource may be one or more narrow artificial intelligence agents, one or more processing circuits, a memory unit, and the like.

According to an embodiment, the perception related process does not include steps 210 and 220 and the determining of step 230 impact any response related to the identified scenario (other than step 240).

According to an embodiment, the perception related process impacts the execution of future iterations of step 210 and/or step 220.

According to an embodiment, step 230 includes at least one of steps 231, 232, 233 and 234.

According to an embodiment, step 231 includes determining the resource operation parameter by a machine learning process trained to infer the resource operation parameter based on the identified situation.

According to an embodiment, step 220 is executed by a first machine learning process and step 231 is executed by a second machine learning process that differs from the first machine learning process.

According to an embodiment, step 232 includes determining the resource operation parameter according to an applicable performance indicator, applicable in the operation of the perception related process to achieve a specified performance. The applicable performance indicator may include for example desired power consumption and/or desired resolution and the like.

According to an embodiment, step 233 includes determining the resource operation parameter according to an applicable tradeoff indicator indicative of a tradeoff between resource consumption and perception accuracy of the perception related process.

According to an embodiment, step 230 includes step 234 of determining the the resource operation parameter based on a rate of changes within the environment. Method 200 may include receiving an estimate of the rate of changes or estimating the rate of changes.

According to an embodiment, the rate of changes is estimated based on the propagation speed of the vehicle and/or the environment of the vehicle. It is expected that the rate of changes within the environment when driving through a dense and highly populated urban environment-exceeds the rate of changes within the environment when driving through a desolate highway.

According to an embodiment, a change within the environment may include an inclusion of a road user within the environment, an exclusion of the road user from an environment, any change in a behavior of a road user within the environment, a change in any traffic conditions, any changes related to a path of the vehicle—for example a curve, a junction, and the like. According to an embodiment, the rate of change is estimated based on changes that are expected to impact the progress of the vehicle—for example a pedestrian that enters a path of the vehicle, a change in the smoothness of the road, and the like.

According to an embodiment, the rate of change is estimated based on previous changes that occurred within the environment, on previous changes that occurred within similar environment. The previous changes may have occurred in the presence of the vehicle and/or in the presence of other vehicles.

According to an embodiment, step 230 includes step 235 of determining of the resource operation parameter based on information pertaining to a road user within the scenario. According to an embodiment, the environmental information includes the information pertaining to a road user. According to an embodiment, the environmental information is further processed to provide the information pertaining to the road user.

According to an embodiment, step 235 is based on an impact of the detected road user on the driving of the vehicle.

According to an embodiment, step 235 includes (or is preceded by) detecting of the road user by finding a match between a signature of the road user and a cluster signature of a cluster that is associated with the road user.

According to an embodiment, step 230 is followed by step 240 of responding to the determining of the resource operation parameter.

According to an embodiment step 240 includes at least one of:

a. Step 241 of making the resource operation parameter available in the operation of the perception related process. According to an embodiment, step 241 includes making the resource operation parameter available by storing the resource operation parameter at a memory unit accessible by a processing circuit that controls at least some aspects of the perception related process. Step 241 may trigger a selection of one or more narrow AI agents of a group of narrow AI agents.

b. Step 242 of executing the perception related process. According to an embodiment, the executing includes generating one or more narrow AI agents driving related suggestions. According to an embodiment, the execution includes triggering and/or determining and/or suggesting and/or instructing and/or executing a driving related operation based on the one or more narrow AI agents driving related suggestions.

According to an embodiment, the resource operation parameter dictates a selection of one or more narrow AI agents of a group of narrow AI agents.

According to an embodiment, step 240 triggers a determining and/or suggesting and/or instructing and/or executing a driving related operation based on the one or more narrow AI agents driving related suggestions.

According to an embodiment, step 240 is followed by step 250 of triggering and/or determining and/or suggesting and/or instructing and/or executing a driving related operation based on the one or more narrow AI agents driving related suggestions.

Figure 3:
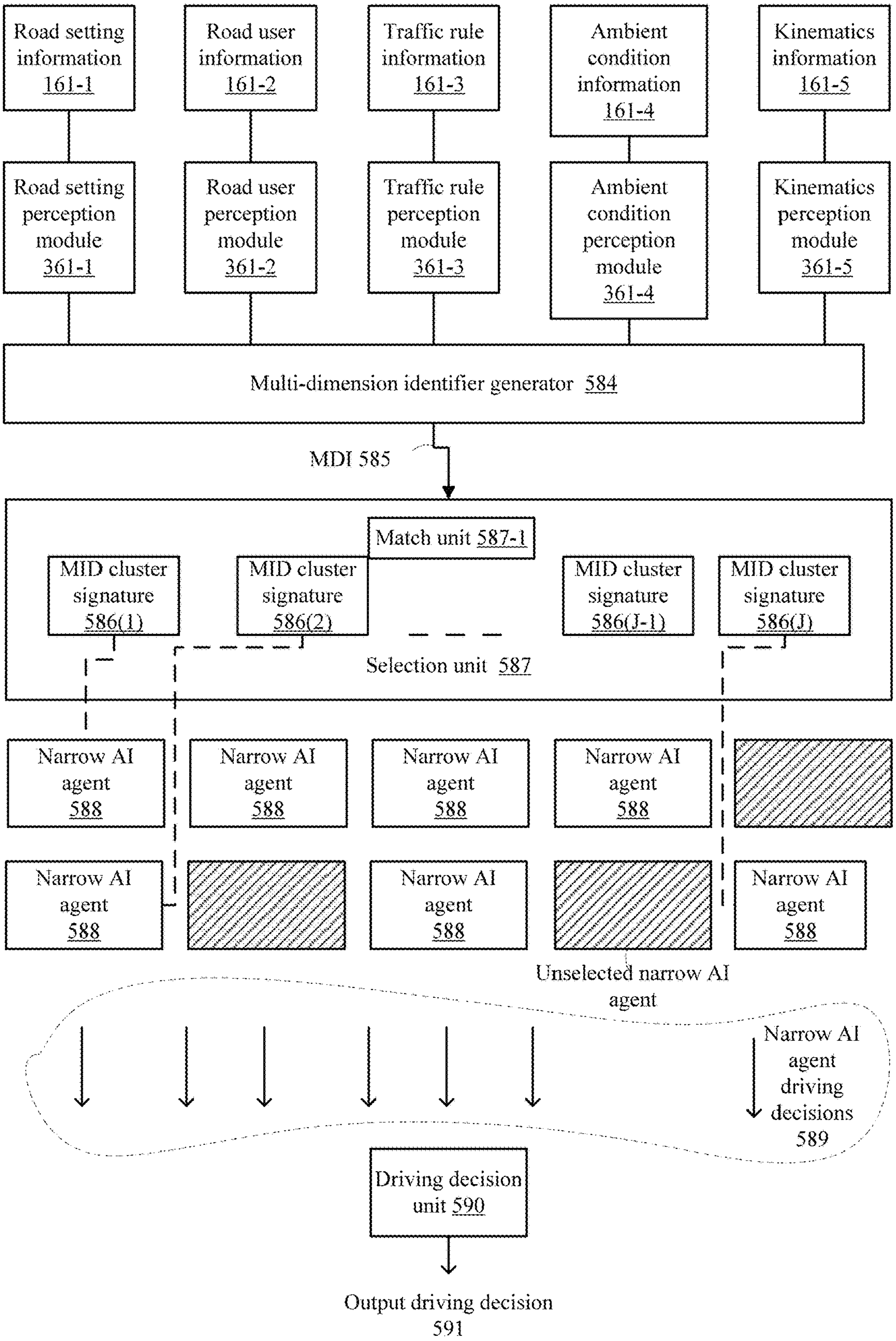
FIG. 3 is a block diagram of an example of a perception related system according to an embodiment of the present disclosure.

FIG. 3 illustrates an example of various perception modules, an MDI generator, a selection unit narrow AI agents and a driving decision unit.

The perception modules include:

i. Road setting perception module 361-1.
ii. Road user perception module 361-2.
iii. Traffic rule perception module 361-3.
iv. Ambient condition perception module 361-4.
v. Ego vehicle kinematics perception module 361-5

FIG. 3 also illustrates an unselected perception module 582(6) that may be idle.

The selection unit 587 identifies one or more narrow AI agents by comparing the MDI 585 to MDI cluster signatures 586(1)-586(J) to find one or more matching MDI clusters that are associated with one or more narrow AI agents to be selected.

Figure 4:
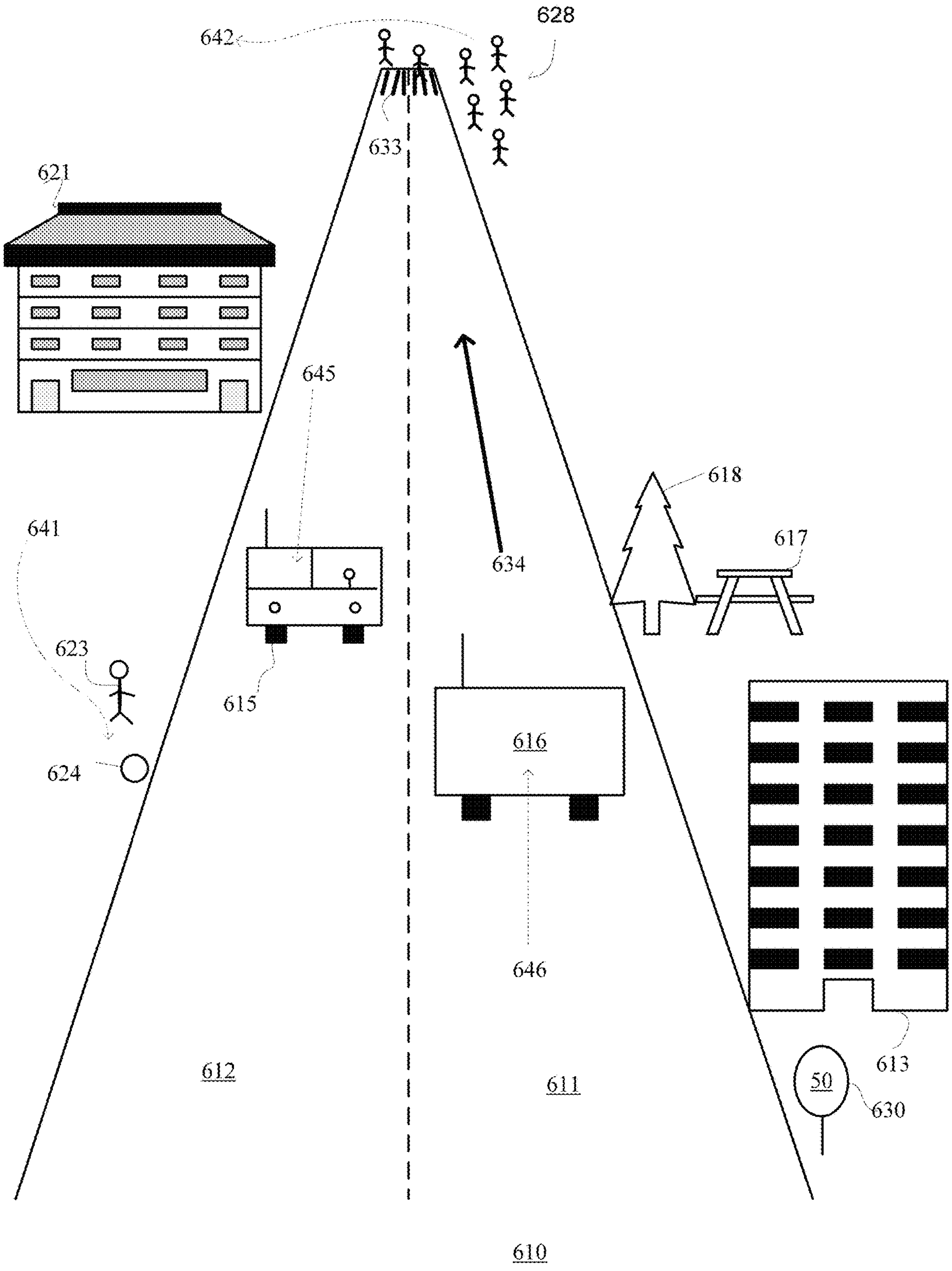
FIG. 4 is an example of an image according to an embodiment of the present disclosure.

The matching MDI clusters are indicative of the narrow AI agents (denoted 588) that should be selected. FIG. 4 also illustrates unselected narrow AI agents (denoted as including a dashed line inner pattern).

The selected narrow AI agents 588 output narrow AI agent driving decisions 589.

A driving decision unit 590 is configured to receive the narrow AI agent driving decisions 589 and generate and output an output driving decision 591 that may be executed by one or more units of the vehicle.

FIG. 4 illustrates an example of an image 610 acquired by a vehicle sensor.

Image 610 shows two lanes 611 and 612 of a road, right building 613, first vehicle 615, second vehicle 616, tree 618, table 617, left building 621, child 623, ball 624, traffic sign 630 indicative of a maximal speed limit (for example—50 Km/H), driving direction arrow 634, zebra crossing 633 and a crowd 628 that is in the process of reaching the zebra crossing and passing the zebra crossing from right to left. FIG. 6 also illustrates a progress (behavior) 641 of child 623, a progress 642 of crowd 628, a progress 645 of first vehicle 615, and a progress 646 of second vehicle 616.

Road user information may be indicative of movable road users such as first vehicle 615, second vehicle 616, child 623 and crowd 628.

Road setting information may be indicative of static objects selected out of lanes 611 and 612, road 610, tree 618, table 617, right building 613 and left building 621—not all of these static objects are taken into account—as not all of these static objects impact the vehicle.

Traffic rule indication information is indicative of traffic sign 630, driving direction arrow 634 and lane boundaries. The traffic rule information may also be learnt from information not included in the image—for example, a data structure that stores traffic rules applicable to the location of the vehicle.

Ambient condition information may indicate that the environment of the vehicle is illuminated by solar radiation and is not obscured by rain or other weather elements.

Ego vehicle kinematics information may be learnt using kinematics sensors such a speed sensor, acceleration sensors and the like. Additionally or alternatively this information may be learnt by processing images acquired by the vehicle—performing visual odometry.

The rate of change in the environment is impacted by the vehicle speed within an urban environment, having second vehicle 612 driving in front of the ego-vehicle, having the first vehicle 615 driving at the opposite lane thereby preventing bypassing the first vehicle, the straight lane and the lack of junction at the vicinity of the vehicle, and the presence of child 623 to the left of the road and the crowd 638 that passes the road. The child 623 moves towards the road— following ball—and having the first vehicle 615 progress towards that location of the ball may indicate that the first vehicle may change its progress—and even move in front of the ego vehicle.

At the time that the image was acquired—more resources may be allocated to the image segments that surround the second vehicle 616, the first vehicle 615, and the child 623—and less resources should be allocated for other parts of the image. At a later point of time more processing resources may be allocated for processing the crowd 638 that crosses the road.

Figure 5:
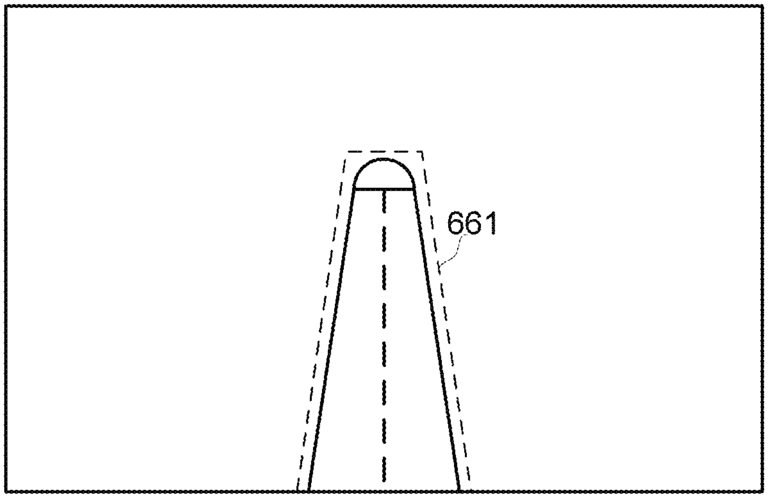
FIG. 5 is an example of an image according to an embodiment of the present disclosure.

FIG. 5 illustrates an image taken when reaching a tunnel—and the resources should be allocated to a small segment 661 of the image that include the lanes within the tunnel and the end of the tunnel. The tunnel may be dark—but for simplicity of explanation the image segment outside small segment 661 is white.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarding the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of transformation module, active learning module, or clustering module, or any other module described herein, may be implemented in hardware and/or code, instructions and/or commands stored in a non-transitory computer readable medium, may be included in a vehicle, outside a vehicle, in a mobile device, in a server, and the like.

The vehicle may be any type of vehicle—such as a ground transportation vehicle, an airborne vehicle, or a water vessel.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Further Embodiments are listed below.

Embodiment 1. A method that is computer implemented and is for perception related processes, the method includes: receiving, by a processing circuit of the vehicle, scenario information about a scenario faced by a vehicle, wherein the scenario information comprises environmental information about an environment of the vehicle; identifying the scenario, by the processing circuit, using the received scenario information; determining, based on the identified scenario, a resource operation parameter that conform to the identified scenario and is related to an operation of a perception related process; and making the resource operation parameter available in the operation of the perception related process.

Embodiment 2. The method according to Embodiment 1, wherein the determining of the resource operation parameter is according to an applicable performance indicator, applicable in the operation of the perception related process to achieve a specified performance.

Embodiment 3 The method according to Embodiments 1 and 2, wherein the determining of the resource operation parameter is according to an applicable tradeoff indicator indicative of a tradeoff between resource consumption and perception accuracy of the perception related process.

Embodiment 4. The method according to Embodiments 1-3, wherein the resource operation parameter dictates a selection of narrow AI perception modules of a group of narrow AI perception modules.

Embodiment 5. The method according to Embodiments 1-4, further including estimating a rate of changes within the environment, wherein the determining of the resource operation parameter is further based on the rate of changes within the environment.

Embodiment 6. The method according to Embodiments 1-5, wherein the estimating of the rate of changes is responsive to a propagation speed of the vehicle.

Embodiment 7. The method according to Embodiments 1-6, wherein the estimating of the rate of changes is further responsive to the environment.

Embodiment 8 The method according to Embodiments 1-7, further including obtaining information pertaining to a road user within the scenario, wherein the determining of the resource operation parameter is further responsive to the detected road user.

Embodiment 9. The method according to Embodiments 1-8, wherein the determining of the sensing solution is further responsive to an impact of the detected road user on a driving of the vehicle.

Embodiment 10. The method according to Embodiments 1-9, wherein the detecting of the road user includes finding a match between a signature of the road user and a cluster signature of a cluster that is associated with the road user.

Embodiments 11. The method according to Embodiments 1-10, wherein the identifying the scenario comprises finding a match between a signature of a part of the scenario information and a cluster signature of a cluster that is associated with the scenario.

Embodiment 12. A non-transitory computer readable medium for perception related processes, the non-transitory computer readable medium stores instructions that once executed by a computerized system cause the object computerized system to: receive, by a processing circuit of the vehicle, scenario information about a scenario faced by a vehicle, wherein the scenario information comprises environmental information about an environment of the vehicle; identify the scenario, by the processing circuit, using the received scenario information; determine, based on the identified scenario, a resource operation parameter that conform to the identified scenario and is related to an operation of a perception related process; and make the resource operation parameter available in the operation of the perception related process.

Embodiment 13. The non-transitory computer readable medium according to Embodiment 12, wherein the determining of the resource operation parameter, is according to an applicable performance indicator, applicable in the operation of the perception related process to achieve a specified performance.

Embodiment 14. The non-transitory computer readable medium according to Embodiments 12 and 13, wherein the determining of the resource operation parameter is according to an applicable tradeoff indicator indicative of a tradeoff between resource consumption and perception accuracy of the perception related process.

Embodiment 15. The non-transitory computer readable medium according to Embodiments 12-14, wherein the resource operation parameter dictates a selection of narrow AI perception modules of a group of narrow AI perception modules.

Embodiment 16. The non-transitory computer readable medium according to Embodiments 12-15, further storing instructions for estimating a rate of changes within the environment, wherein the determining of the resource operation parameter is further based on the rate of changes within the environment.

Embodiment 17. The non-transitory computer readable medium according to Embodiments 12-16, wherein the estimating of the rate of changes is responsive to at least one of a propagation speed of the vehicle, or the environment.

Embodiment 18. The non-transitory computer readable medium according to Embodiments 12-17, further storing instructions for obtaining information pertaining a road user within the scenario, wherein the determining of the resource operation parameter is further responsive to the detected road user.

Embodiment 19. A computerized system for perception related processes, the computerized system includes: a memory unit that is configured to store scenario information about a scenario faced by a vehicle; wherein the scenario information includes environmental information about an environment of the vehicle; and a processing circuit that is configured to: identify the scenario using the received scenario information; determine, based on the identified scenario, a resource operation parameter that conform to the identified scenario and is related to an operation of a perception related process; and make the resource operation parameter available in the operation of the perception related process.

I claim:

1. A method that is computer implemented and is for perception related processes, the method comprising:

receiving, by a processing circuit of a vehicle, scenario information about a scenario faced by the vehicle, wherein the scenario information comprises environmental information about an environment of the vehicle, wherein the scenario information is determined from images acquired by a vehicle sensor;

identifying the scenario, by the processing circuit, using the received scenario information;

obtaining information pertaining to dynamic road elements that are within a defined range from the vehicle;

determining, based on the identified scenario and the dynamic road elements that are within a defined range from the vehicle, a resource operation parameter that conforms to the identified scenario and is related to an operation of a perception related process; wherein the determining of the resource operation parameter comprises (a) allocating more resources to image segments of an image of the images, the image segments include pixels related to the dynamic road elements that are within the defined range from the vehicle and (b) allocating less resources to other segments of the image;

making the resource operation parameter available in the operation of the perception related process; and autonomously driving the vehicle based on the determining of the resource operation parameter.

2. The method according to claim 1, wherein the determining of the resource operation parameter is according to an applicable performance indicator, applicable in the operation of the perception related process to achieve a specified performance.

3. The method according to claim 1, wherein the determining of the resource operation parameter is according to an applicable tradeoff indicator indicative of a tradeoff between resource consumption and perception accuracy of the perception related process.

4. The method according to claim 1, wherein the resource operation parameter further dictates a selection of narrow AI perception modules of a group of arrow AI perception modules.

5. The method according to claim 1, further comprising estimating a rate of changes within the environment, wherein the determining of the resource operation parameter is further based on the rate of changes within the environment.

6. The method according to claim 5, wherein the estimating of the rate of changes is responsive to a propagation speed of the vehicle.

7. The method according to claim 6, wherein the estimating of the rate of changes is further responsive to the environment.

8. The method according to claim 1, wherein the obtaining of information comprises detecting each dynamic road user, by finding a match between a signature of the dynamic road user and a cluster signature of a cluster that is associated with the dynamic road user.

9. The method according to claim 1, wherein the identifying of the scenario comprises finding a match between a signature of a part of the scenario information and a cluster signature of a cluster that is associated with the scenario.

10. A non-transitory computer readable medium for perception related processes, the non-transitory computer readable medium stores instructions that once executed by a computerized system cause the object computerized system to:
- receive, by a processing circuit of a vehicle, scenario information about a scenario faced by the vehicle, wherein the scenario information comprises environmental information about an environment of the vehicle, wherein the scenario information is determined from images acquired by a vehicle sensor;
- identify the scenario, by the processing circuit, using the received scenario information; obtain information pertaining to dynamic road elements that are within a defined range from the Vehicle;
- determine, based on the identified scenario and the dynamic road elements that are within a defined range from the vehicle, a resource operation parameter that conforms to the identified scenario and is related to an operation of a perception related process; wherein the determining of the resource operation parameter comprises (a) allocating more resources to image segments of an image of the images, the image segments include pixels related to the dynamic road elements that are within the image;
- make the resource operation parameter available in the operation of the perception related process; and
- autonomously drive the vehicle based on the determining of the resource operation parameter.

11. The non-transitory computer readable medium according to claim 10, wherein
- the determining of the resource operation parameter, is according to an applicable performance indicator, applicable in the operation of the perception related process to achieve a specified performance.

12. The non-transitory computer readable medium according to claim 11, wherein the obtaining of information comprises detecting each dynamic road user, by finding a match between a signature of the dynamic road user and a cluster signature of a cluster that is associated with the dynamic road user user.

13. The non-transitory computer readable medium according to claim 10, wherein the determining of the resource operation parameter is according to an applicable tradeoff indicator indicative of a tradeoff between resource consumption and perception accuracy of the perception related process.

14. The non-transitory computer readable medium according to claim 10, wherein the resource operation parameter further dictates a selection of narrow AI perception modules of a group of narrow AI perception modules.

15. The non-transitory computer readable medium according to claim 10, further storing instructions for estimating a rate of changes within the environment, wherein the determining of the resource operation parameter is further based on the rate of changes within the environment.

16. The non-transitory computer readable medium according to claim 15, wherein the estimating of the rate of changes is responsive to at least one of a propagation speed of the vehicle, or the environment.

17. A computerized system for perception related processes, the computerized system comprises:
- a memory unit that is configured to store scenario information about a scenario faced by a vehicle; wherein the scenario information comprises environmental information about an environment of the vehicle, wherein the scenario information is determined from images acquired by a vehicle sensor; and
- a processing circuit that is configured to:
  - identify the scenario using the received scenario information;
    - obtain information pertaining to dynamic road elements that are within a defined range from the vehicle;
- determine, based on the identified scenario and the dynamic road elements that are within a defined range from the vehicle, a resource operation parameter that conforms to the identified scenario and is related to an operation of a perception related process; wherein the determining of the resource operation parameter comprises (a) allocating more resources to image segments of an image of the images, the image segments include pixels related to the dynamic road elements that are within the defined range from the vehicle and (b) allocating less resources to other segments of the image;
- make the resource operation parameter available in the operation of the perception related process; and
- control an autonomous driving of the vehicle based on the determining of the resource operation parameter.

* * * * *